US008585101B2

(12) United States Patent
Loebig

(10) Patent No.: US 8,585,101 B2
(45) Date of Patent: Nov. 19, 2013

(54) FLANGE CONNECTION

(75) Inventor: Arnold Loebig, Weiterstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 201 days.

(21) Appl. No.: 13/181,896

(22) Filed: Jul. 13, 2011

(65) Prior Publication Data

US 2012/0038152 A1 Feb. 16, 2012

(30) Foreign Application Priority Data

Jul. 27, 2010 (DE) ......................... 10 2010 032 319

(51) Int. Cl.
*F16L 23/00* (2006.01)

(52) U.S. Cl.
USPC .............................. 285/406; 285/420; 24/278

(58) Field of Classification Search
USPC ................. 285/414, 420, 406, 407, 408, 410; 24/278
See application file for complete search history.

(56) References Cited

U.S. PATENT DOCUMENTS

| | | | | |
|---|---|---|---|---|
| 6,464,268 | B1 * | 10/2002 | Hough et al. | 285/367 |
| 2003/0005980 | A1 * | 1/2003 | Kreipe et al. | 148/325 |
| 2010/0041287 | A1 * | 2/2010 | Woods et al. | 440/89 R |

* cited by examiner

*Primary Examiner* — Aaron Dunwoody
(74) *Attorney, Agent, or Firm* — Ingrassia Fisher & Lorenz, P.C.

(57) ABSTRACT

A flange connection is provided for a turbocharger and an exhaust system. The flange connection includes, but is not limited to a clamping bracket that engages over flanges provided on the turbocharger and on the exhaust system and clamps them with one another using at least one screw, which, using a screw thread provided in the clamping bracket, exerts pressure on a pressure part, which in turn exerts pressure on the edges of flanges.

13 Claims, 3 Drawing Sheets

FLANGE CONNECTION

CROSS-REFERENCE TO RELATED APPLICATION

This application claims priority to German Patent Application No. 102010032319.5, filed Jul. 27, 2010, which is incorporated herein by reference in its entirety.

TECHNICAL FIELD

The technical field relates to a flange connection of a turbocharger to an exhaust system.

BACKGROUND

An exhaust gas turbocharger and an exhaust system downstream therefrom are frequently provided in the exhaust train of modern internal combustion engines. The intake of the exhaust system is typically formed by a catalytic converter, in the case of gasoline engines, or a converter of a particulate filter, in the case of diesel engines. These elements must be connected to one another during the assembly of the vehicle.

Such connections are frequently produced using a flange connection, using which two flanges, one of which is provided on the turbocharger and one on the intake of the exhaust system, are screwed onto one another. For this purpose, multiple holes are provided in each of the flanges, through which screws or stud bolts having threads can be guided, on which nuts can be screwed for fixing.

The assembly of these screw connections is complex, since all, for example, three screw connections, are to be individually produced manually. Furthermore, the installation location of such a flange connection is often reachable with difficulty or only partially. This means a large installation space is required, sometimes also having significant recesses of the surrounding parts.

In relation thereto, it is at least one object to specify a flange connection of a turbocharger and an exhaust system which is simple to assemble. In addition, other objects, desirable features and characteristics will become apparent from the subsequent summary and detailed description, and the appended claims, taken in conjunction with the accompanying drawings and this background.

SUMMARY

The at least one object is achieved with a flange connection of a turbocharger and an exhaust system, a clamping bracket being provided, which engages over flanges provided on the turbocharger and on the exhaust system and clamps them with one another using at least one screw, which, using a screw thread provided in the clamping bracket, exerts pressure on a pressure part, which in turn exerts pressure against the edges of the flanges.

In this flange connection, the flanges of turbocharger and intake of the exhaust system are no longer screwed directly together with one another, but rather the flanges are fixed against one another using a clamping bracket and additionally fixed and braced against one another using a screw bracing.

The flange connection is optimized for very tight space conditions having small installation space and difficult assembly conditions. The parts in the surroundings of the flange connection can be designed more simply, as can the assembly tools. A single optimally accessible screw perpendicular to the flange connection ensures better assembly. Free space must no longer be left out in this case in the catalytic converter or the converter for the diesel particulate filter. The parts are thus less complicated and have a better flow against the monoliths of the catalytic converter in the gasoline engine or the diesel particulate filter in the diesel engine. A higher overall power of the engine thus results, with lower pollutant emissions. Cost savings are achieved not only in the flange connection, but rather also in the surrounding parts, and for the tools and production. Less material is required at lower weight. Furthermore, fewer parts are required. Installation space is obtained in the engine or vehicle compartment and the vehicle can be made more compact in the engine compartment.

For example, in contrast to V-band clamps, no deformation or bending of a part of the flange connection is required, so that the components of the flange connection are optionally even usable multiple times. In addition, special screws do not have to be used, as in the case of known V-band clamps; in contrast, conventional screws can be used for bracing in the flange connection.

One embodiment provides that the screw is provided approximately centrally in the clamping bracket and is oriented approximately perpendicularly to the connection area of the flanges. The screw is thus oriented centrally and perpendicularly toward the flanges to be connected and can thus be reached and installed well.

For further increased fixing of both the screw bracing and also the flanges to one another, the pressure part has a V-shaped contact surface having internal contour which presses against a V-shaped external contour of the edges of the flanges. The position of the pressure part is thus secured. In addition, the flanges are pressed against one another using the opposing external contour thereof.

According to a further embodiment, the clamping bracket has a contour. Furthermore, the flanges have a mirror-symmetric counter contour. The installation positions of turbocharger and exhaust system to one another and also of clamping bracket, on the one hand, and the two flanges, on the other hand, are defined still better. This advantage and further improved fixing of the screw bracing are achieved by a further embodiment, according to which the clamping bracket has an essentially round contour having two flat spots and the flanges have a mirror-symmetric counter contour having corresponding flat spots.

This fixing can be improved further in that, as provided according to a further embodiment, the screw bracing is situated on the clamping bracket approximately opposite to the flat spots. The screw bracing thus exerts pressure on the areas having the flat spots, so that they cannot pivot in relation to one another. For this purpose, the flat spots, as provided according to a further embodiment of the invention, are advantageously situated on the circumference of the clamping bracket and the flanges at an angle of approximately 90° to one another. For simpler manufacturing of its profile, the clamping bracket itself can be constructed from multiple, preferably two half-shells.

According to a further embodiment, it is provided for this purpose that the clamping bracket is constructed from two half-shells which are welded or flanged with one another around their circumference. Both parts of the clamping bracket thus encompass the full circumference of the flanges in each case, but each only form one (longitudinal) half of the clamping bracket. They are welded or flanged with one another.

In another variant provided according to a further embodiment, the clamping bracket is constructed from two half-round half-shells, which each encompass approximately half of the circumference of the flange connection and are connected to one another via at least one web. The two parts of the clamping bracket each encompass both flanges, but only on approximately half of the circumference of the flange connection. Of course, the two parts are also connected to one another here.

According to a further embodiment, it is provided that the screw of the screw bracing has a pin which engages in a recess provided in the pressure part. The screw is thus additionally secured against slipping in relation to the pressure part.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
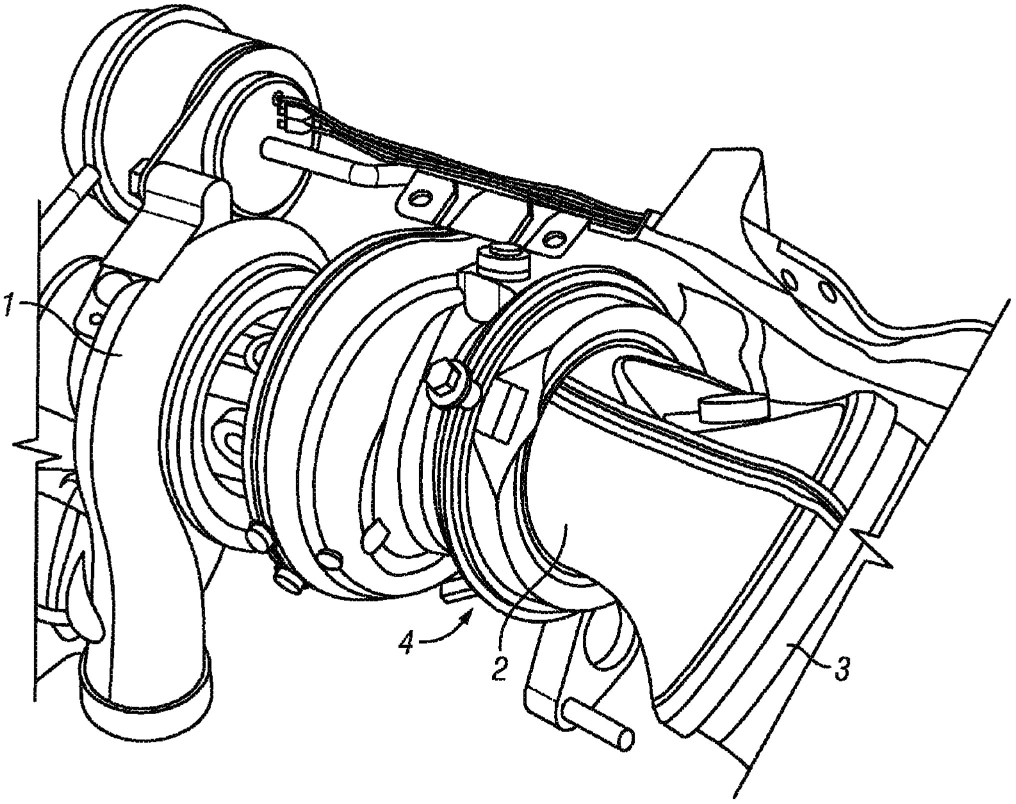
FIG. 1 shows a top view of a part of an internal combustion engine and a part of the exhaust train thereof having turbocharger and catalytic converter.

FIG. 1 shows a top view of a small part of an internal combustion engine and a part of its exhaust train. A turbocharger 1 and an intake 2, which is connected downstream therefrom on the exhaust gas side, of an exhaust system, not shown in greater detail, are visible in the figures. The intake 2 of the exhaust system is formed here by an intake of the catalytic converter 3, in gasoline engines. In diesel engines, it would be a converter of a particulate filter instead of the catalytic converter 3. Both the turbocharger 1 and also the catalytic converter 3 each have a flange, which are connected using a flange connection 4 according to an embodiment. This flange connection 4 is shown enlarged in FIG. 2.

Figure 2:
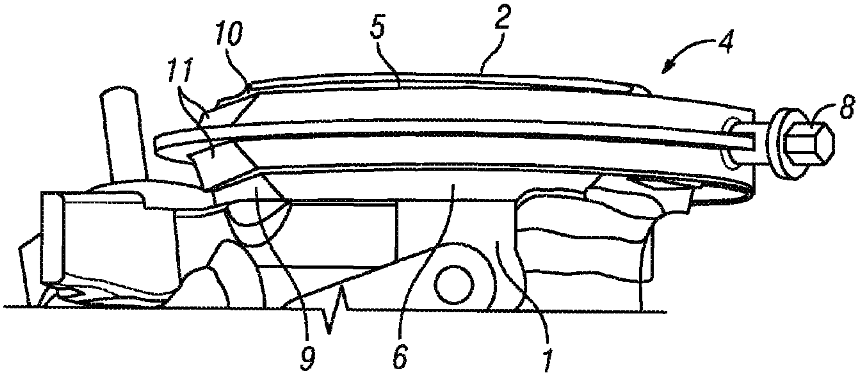
FIG. 2 shows a flange connection according to an embodiment in a side view.

FIG. 2 shows that the turbocharger 1 has a flange 6. Furthermore, the catalytic converter or its intake 2 has a flange 5. Both flanges 5 and 6 are connected to one another using a flange connection 4 according to an embodiment. Furthermore, FIG. 2 shows that the flange connection 4 has a clamping bracket 7, which is clamped around the ends of the flanges 5 and 6. The tension is generated using a screw 8. Furthermore, a flat spot 9 or 10 provided in both flanges 6 and 5, respectively, is visible in FIG. 2, which is also found again in similar form in the clamping bracket 7 as a flat spot 11 in the otherwise round contour. Actually, each of the two flanges 6 and 5 has two such flat spots 9 or 10 in each case, whose function will be explained in greater detail hereafter.

Figure 3:
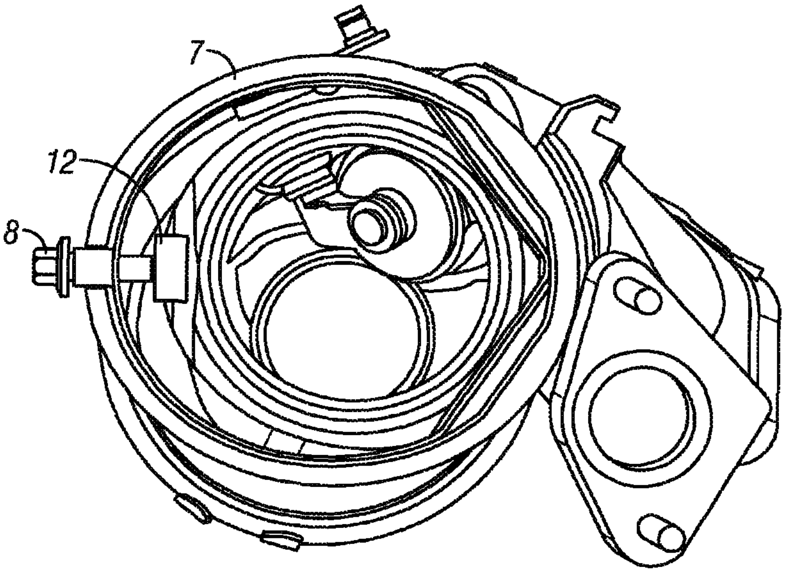
FIG. 3 shows a flange connection according to an embodiment in a top view and in section.

FIG. 3 shows a flange connection according to the invention from one cutaway side. The clamping bracket 7 is obvious, in which the screw 8 is guided in a thread, not visible in the figure. The screw 8 exerts pressure on a pressure part 12, which in turn exerts pressure on the two edges of the flanges 5 and 6 and holds them together.

Figure 4:
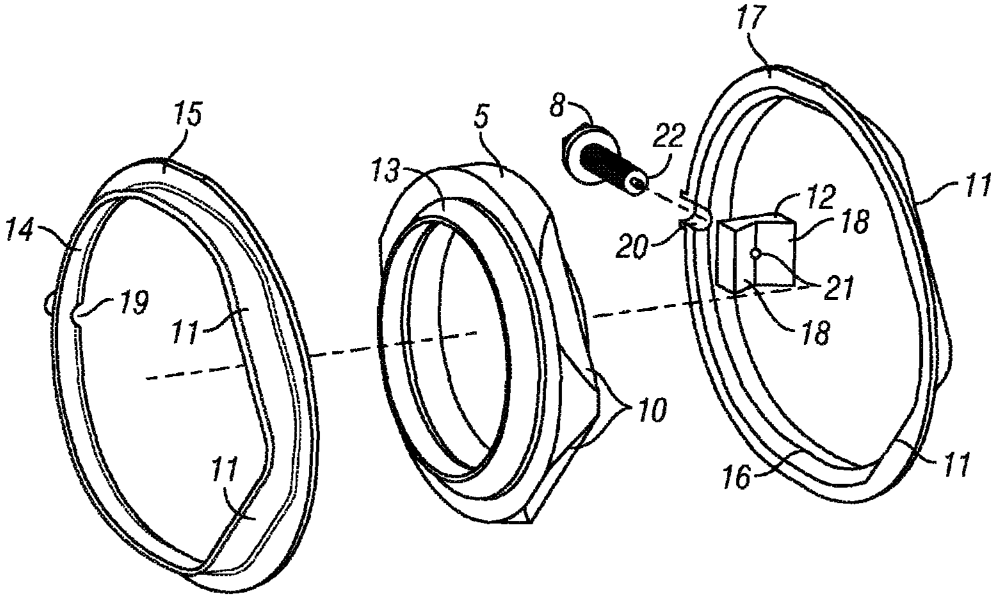
FIG. 4 shows an exploded view of a flange connection according to an embodiment.

FIG. 4, which shows the elements of a flange connection according to an embodiment in a type of exploded view and partially in section. FIG. 4 shows that the clamping bracket 7 of FIG. 2 and FIG. 3 is constructed from two halves 14 and 16, which have edges 15 and 17, which are connected to one another, for example, using welding or flanging, as is obvious in FIG. 2 and FIG. 3.

FIG. 4 shows the flange 5 of the catalytic converter 3 of the view according to FIG. 1 and FIG. 2. The flange 5 has an outwardly tapering internal contour 13, which engages in the installed state in a corresponding counter internal contour, not shown in the figure, of the flange 6, also not shown in FIG. 4, of the turbocharger 1, so that the two flanges 6 and 5 are centered with one another using these internal contours.

As shown in FIG. 4, the flange 5 has two flat spots 10, which are provided on its circumference at an angle of approximately 90° to one another. The two shell halves 14 and 16 also each have two flat spots 11, which are shaped and situated correspondingly to the flat spots 10. At least four flat spots (11; 8; 10) can also be provided. The flat spots 10 and 11 engage in one another in the assembled state and thus secure the participating parts against pivoting relative to one another. This is correspondingly true for the flat spots 9 of the flange 6 corresponding to FIG. 2, which is not shown in FIG. 4.

Furthermore, FIG. 4 shows that the pressure part 12 has a V-shaped area 18 having internal contour which presses on the flanges 6 and 5 in the assembled state, which have an opposing V-shaped structure formed outward in the corresponding areas, and thus fixes and braces the flanges 6 and 5 and the clamping bracket 7. The halves 14 and 16 of the clamping bracket 7 have recesses 19 and 20 provided with threads. The screw 8 has a corresponding thread, which engages in the thread of the recesses 19 and 20, so that the screw 8 is capable of exerting pressure on the pressure part 12, which in turn presses against the edges of the flanges 6 and 5.

The procedure of the assembly of the flange connection according to the invention is explained in greater detail hereafter with reference to FIG. 1 to FIG. 4. During the assembly, the opening of the clamping bracket 7 is guided approximately centrally over the outer contour of the flanges 5 and 6. The clamping bracket 7 is subsequently moved toward the assembler during the assembly, so that the half-shells 14 and 16 of the clamping bracket 7 come into contact at their flat spots 11 on the correspondingly adapted flat spots 10 or 9 of the turbocharger flange 5 or the catalytic converter flange 6. The angle between the flat spots 10/9 or 11 can also be less than or greater than approximately 90° to be optimized for the system. The V-shaped contact surfaces 18 of the pressure part 12 are then brought into contact with the aid of the screw 8 against the correspondingly adapted V-shaped counter surfaces of the flanges 6 and 5 and braced with one another. In this case, the screw 8 is screwed using its external thread into the internal thread halves of the recesses 19 and 20. The thread is cut after the connection of half-shells 14 and 16. A bush can also be inserted and welded in the recesses 19 and 20, with subsequent thread tapping. Simultaneously, the front face of the screw 8 presses against the counter surface of the pressure part 12 due to the tightening, whereby the catalytic converter or converter 3 is clamped with the turbocharger 1. The pressure part 18 can have a central hole 21, in which a pin 22 of the screw 8 is guided with a clearance fit, a slight press fit, or is captively connected thereto for easier assembly.

Figure 5:
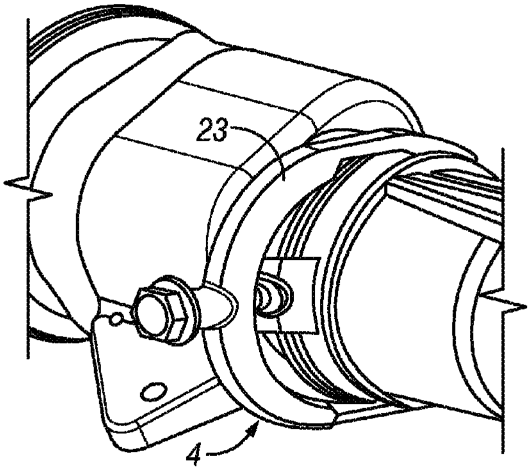
FIG. 5 shows a top view of a second embodiment of the flange connection according to an embodiment.
Figure 6:
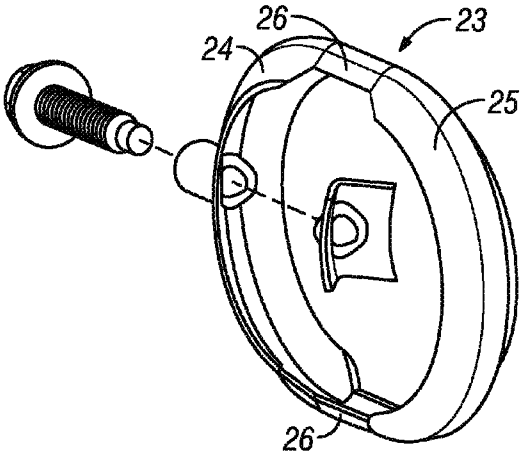
FIG. 6 shows several elements of the flange connection according to FIG. 5.

FIG. 5 and FIG. 6 show the flange connection 4, but with a second embodiment 23 of the clamping bracket. The clamping bracket 23 is constructed from two half-round half-shells 24 and 25, which each encompass approximately half of the circumference of the flange connection and are connected to one another via two webs 26.

Figure 7:
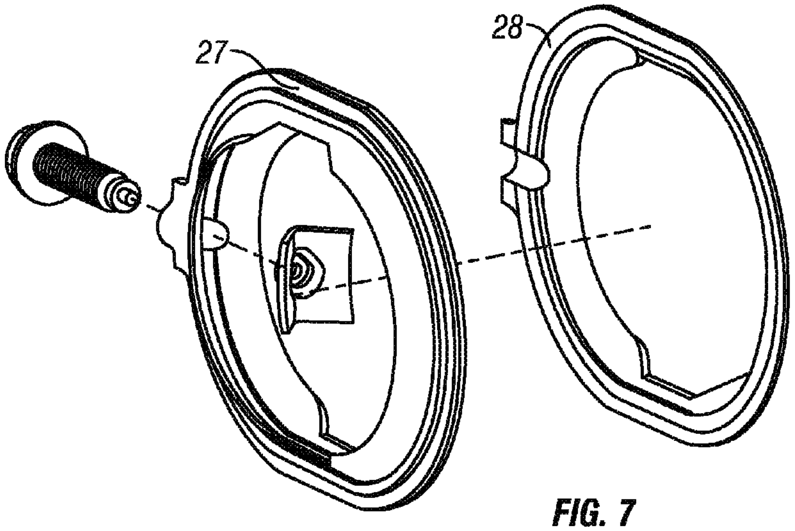
FIG. 7 shows a top view of a third embodiment of the flange connection.

FIG. 7 shows a third embodiment 27 of the clamping bracket. In this embodiment, the clamping bracket is constructed from two halves 28 similarly to those of the first embodiment according to FIG. 1 to FIG. 4, but the halves 28 do not have flat spots.

The embodiments according to FIG. 5 to FIG. 7 additionally have the advantage that they do not require flat spots in the edges of the flanges to be connected. These embodiments of the flange connection are thus usable for flanges of existing, older construction immediately and without having to perform changes on the flanges, which is important and advantageous in particular for use in mass production having existing flange implementations without flat spots.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A flange connection of a turbocharger and an exhaust system, comprising:

- a clamping bracket configured to engage over flanges of the turbocharger and on the exhaust system,
- a screw configured to cooperate with the clamping bracket to brace the turbocharger the exhaust system; and
- a screw thread provided in the clamping bracket configured to exert pressure on a pressure part that in turn exerts pressure on an edge of the flanges,
- wherein the pressure part has a V-shaped contact surface with an internal contour that presses against a V-shaped external contour of the edge of the flanges.

2. The flange connection according to claim 1, wherein the screw is located approximately centrally in the clamping bracket and oriented approximately perpendicularly to a connection area of the flanges.

3. The flange connection according to claim 1, wherein the flange connection is located between the turbocharger and a catalytic converter or a diesel particulate filter.

4. The flange connection according to claim 1, wherein the flange connection is located between the turbocharger and a diesel particulate filter.

5. The flange connection according to claim 1, wherein the clamping bracket comprises a contour and the flanges comprise a mirror-symmetrical counter contour.

6. The flange connection according to claim 5, wherein the clamping bracket comprises an essentially round contour with two flat spots, and the mirror-symmetrical counter contour comprise corresponding flat spots.

7. The flange connection according to claim 6, wherein the screw bracing on the clamping bracket is situated approximately opposite to the corresponding flat spots.

8. The flange connection according to claim 6, further comprising two additional flat spots.

9. The flange connection according to claim 6, wherein the corresponding flat spots are situated on a circumference of the clamping bracket and the flanges at an angle of approximately 90° to one another.

10. The flange connection according to claim 1, wherein the clamping bracket is constructed from two half-shells that are joined around a circumference.

11. The flange connection according to claim 1, wherein the clamping bracket is constructed from two half-round half-shells that each encompass approximately half of a circumference of the flange connection and connected to one another via at least one web.

12. The flange connection according to claim 1, wherein the flanges comprises internal contours that are configured for one another and center the flanges to one another.

13. The flange connection according to claim 1, wherein the screw thread is a threaded bush.

* * * * *